United States Patent [19]

Berlivet et al.

[11] 4,392,339
[45] Jul. 12, 1983

[54] CROP WINDROWING MACHINE HAVING DOUBLE WINDROW-FORMING ATTACHMENT

[75] Inventors: Marc A. Berlivet; Abel A. J. Guerineau, both of Coex, France

[73] Assignee: Hesston Corporation, Hesston, Kans.

[21] Appl. No.: 324,814

[22] Filed: Nov. 25, 1981

[30] Foreign Application Priority Data

Nov. 26, 1980 [FR] France .................. 80 25099

[51] Int. Cl.³ .................................. A01D 57/30
[52] U.S. Cl. ........................... 56/192; 56/13.6; 56/14.5; 56/16.4; 56/228
[58] Field of Search ............ 56/192, 13.6, DIG. 1, 56/DIG. 2, 16.4, 14.5, 228, 11.9

[56] References Cited

U.S. PATENT DOCUMENTS

| | | | |
|---|---|---|---|
| 2,511,841 | 6/1950 | Gaterman | 56/192 |
| 3,717,981 | 2/1973 | van der Lely | 56/192 |
| 3,772,865 | 11/1973 | Ruprecht et al. | 56/192 |

FOREIGN PATENT DOCUMENTS

| | | | |
|---|---|---|---|
| 2131598 | 12/1972 | Fed. Rep. of Germany | 56/DIG. 1 |
| 2712645 | 9/1978 | Fed. Rep. of Germany | 56/DIG. 1 |

*Primary Examiner*—Jay N. Eskovitz
*Attorney, Agent, or Firm*—Schmidt, Johnson, Hovey & Williams

[57] ABSTRACT

The windrower, which may be of the mower or mower-conditioner type, is provided with a double windrowing attachment at the rear thereof which may be lowered into a double windrowing mode or raised into a non-operative position for single windrowing. Severed crops are converged centrally of the machine from opposite sides of the cutting path taken by the machine so as to be discharged onto the ground in a single, centrally disposed windrow when the attachment is in its raised position. Actuation of the hydraulic circuitry associated with the attachment to lower the same into its operating position during a next pass around the field causes a conveyor of the attachment to intercept the centrally and rearwardly discharged crop so as to instead divert and convey the same to a laterally outboard position in order that the windrow of that crop cutting pass will be laid adjacently alongside of the previously formed single windrow for the next preceding pass. A special hydraulic circuit for raising and lowering the double windrowing attachment also operates lift apparatus for the cutting mechanism of the windrower, yet allows raising and lowering of the attachment independently of the cutting mechanism.

5 Claims, 6 Drawing Figures

CROP WINDROWING MACHINE HAVING DOUBLE WINDROW-FORMING ATTACHMENT

TECHNICAL FIELD

This invention relates to crop harvesters and, more particularly, to that class of harvesting equipment known as windrowers, windrower mowers, or windrower mower-conditioners.

BACKGROUND ART

Self-propelled machines currently exist which can be equipped with a diagonally extending conveyor assembly in order that harvested crops are delivered to the inboard side of the path of cut taken by the machine, and, thus placed in a windrow alongside the standing crop yet to be cut. Then, on the next pass by the machine in the opposite direction, the same conveyor assembly delivers the severed material diagonally into a second windrow alongside the first, thereby providing double windrows for pickup by subsequent baling or other harvesting equipment. However, this type of double windrowing equipment is not designed for selective use; that is, the diagonal conveyor assembly is used continually throughout the harvesting procedure on every pass of the machine and requires that the machine go back and forth across the field instead of in a perimetricalmanner as is often preferred or necessary.

SUMMARY OF THE PRESENT INVENTION

Accordingly, one object of the present invention is to provide a double windrowing method and apparatus suitable for pull-type, mounted or semi-mounted arrangements wherein the mowing function is carried out in a laterally offset position relative to the path of travel of the primary vehicle either towing the machine or otherwise adapting it for movement across the field. Furthermore, it is an objective to provide an arrangement whereby such offset operating machines which normally discharge the crops centrally behind the machine out of the path having been traversed by the vehicle can be adapted to deposit their crops into the path of travel of the vehicle behind the latter when double windrowing is desired.

Pursuant to the above, the present invention contemplates attaching a special double windrowing mechanism to the rear of a windrowing machine wherein the crops are gathered centrally, and, thus, discharged in a centrally disposed stream during normal operation. Arms swingably attached to the frame of the machine carry a transverse conveyor of the attachment and may be hydraulically raised and lowered to correspondingly maintain the conveyor in a raised position for transport or a lowered position in which it intercepts the rearwardly flowing stream of crop material and conveys it laterally. The discharge end of the conveyor is so disposed that, when the conveyor is lowered and in operation, the crop materials will be dumped into the area of the previous cutting pass taken by the machine so as to be positioned in a windrow alongside of that formed during such previous pass when the attachment was raised out of its crop intercepting position. A trough of the conveyor open at its front side to receive the rearwardly discharging crop materials houses an auger which serves to feed the materials to their outboard location during double windrowing. A hydraulic cylinder coupled with the conveyor to raise and lower the same is connected in a parallel fluid flow relationship with another hydraulic cylinder that raises and lowers the cutting mechanism of the machine between transport and working positions. Because the cylinder of the double windrowing attachment is so designed that it can raise the attachment with less pressure than that required to raise the cutting mechanism, the attachment can indeed be raised without concurrently causing lifting of the cutting mechanism even though pressurized fluid flows to both cylinders on the same, simplified circuit. Once the circuit is more highly pressurized, such as when the attachment reaches its fully raised position, the additional pressure needed to also raise the cutting mechanism can be applied to the circuit to likewise accomplish such raising of the cutting mechanism. A special one-way check valve and selectively operable control valve associated with the lift circuit for the double windrowing attachment permits the latter to either be hydraulically held at a raised position, regardless of the fact that the cutting mechanism may have been lowered, or the attachment may itself be lowered by appropriate actuation of the control valve to bypass the one-way check valve.

DETAILED DESCRIPTION

Figure 1:
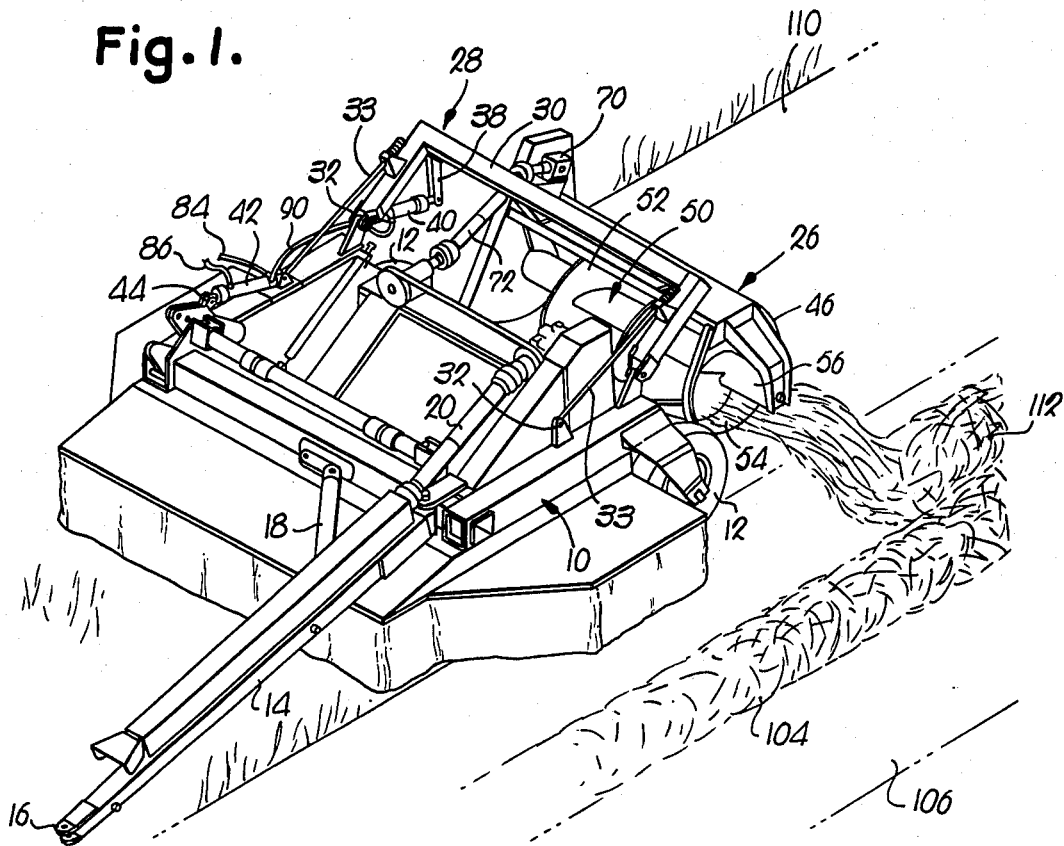
FIG. 1 is a left front perspective view of a windrowing machine and double windrowing attachment constructed in accordance with the principles of the present invention and capable of carrying out our novel method.
Figure 2:
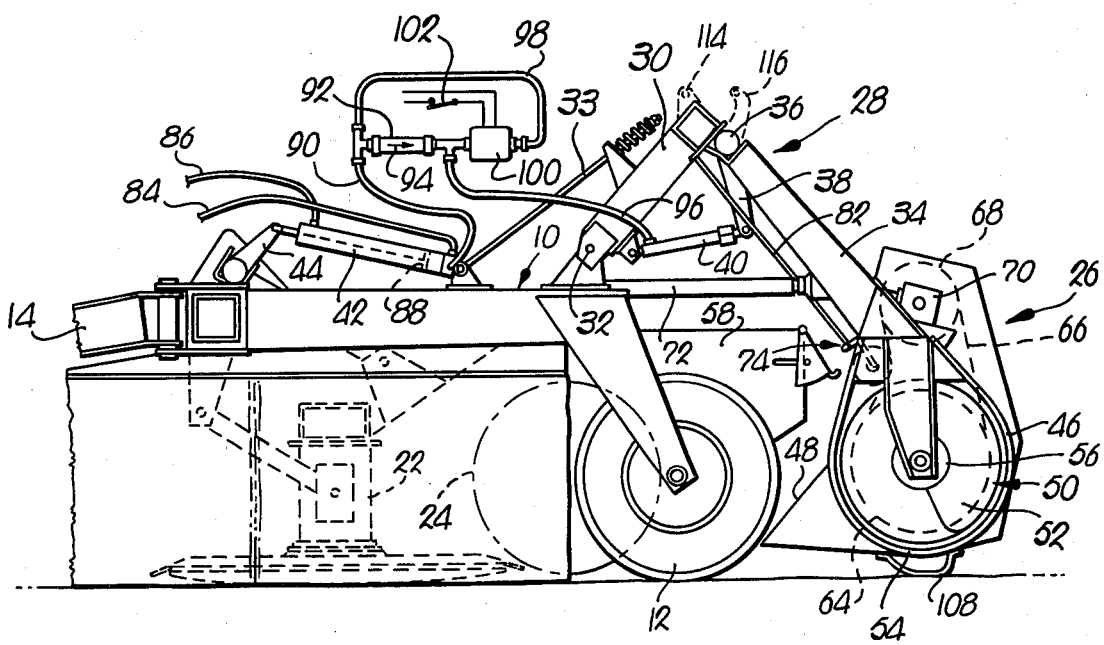
FIG. 2 is a fragmentary side elevational view of the machine.

The harvesting machine of the present invention is provided with a frame 10 adapted for movement across a field by ground wheels 12. A tongue 14 at the forward extremity of the frame 10 adapts the latter for connection to a towing vehicle through a hitch 16. The tongue 14 is normally disposed in an oblique relationship to the frame 10 and its path of travel in order that frame 10 will be disposed in a laterally offset relationship with the towing vehicle, essentially, if not entirely, off to one side thereof since the vehicle will normally be traveling in a cut area of the field whereas the machine will be traveling in an uncut area to the side thereof. The exact position of the tongue 14 can be adjusted via mechanism 18 between the tongue 14 and the frame 10, and a mechanical drive line 20 is carried along the top of the tongue 14 and overlies the frame 10 for supplying operating power to the various components of the harvesting machine.

The frame 10 is generally U-shaped when viewed in plan and carries crop cutting mechanism broadly denoted by the numeral 22, as well as crop conditioning mechanism denoted by the numeral 24, and double windrowing mechanism broadly denoted by the numeral 26. The cutting mechanism 22 is carried by the frame 10 for vertical swinging movement between raised and lowered positions thereof, the conditioning mechanism 24 is carried in an essentially fixed position relative to the ground and may be of any suitable type, and the double windrowing mechanism 26 is carried for vertical swinging movement between its selected positions by an arm assembly 28.

The arm assembly 28 includes a first generally U-shaped part 30 of rigid configuration and construction that is pivoted to the frame 10 by the pivotal connections 32 but is held against such pivoting by retaining links 33 on opposite lateral sides of the frame. A second part of the arm assembly 28 includes a pair of depending and rearwardly extending arms 34 at opposite lateral extremes of the U-shaped part 30, such arms 34 being interconnected by a rigid member 36 that is pivotally coupled with the U-shaped part 30. Thus, the arms 34 move together when the member 36 is rotated, such as by a rigid crank 38 which depends therefrom. The crank 38 is preferrably operated by a fluid pressure piston and cylinder device 40 that is anchored to the U-shaped part 30 of the arm assembly 28. A second hydraulic piston and cylinder unit 42 is coupled between the frame 10 and a crank 44 which mechanically raises and lowers the cutting mechanism 22.

Figure 3:
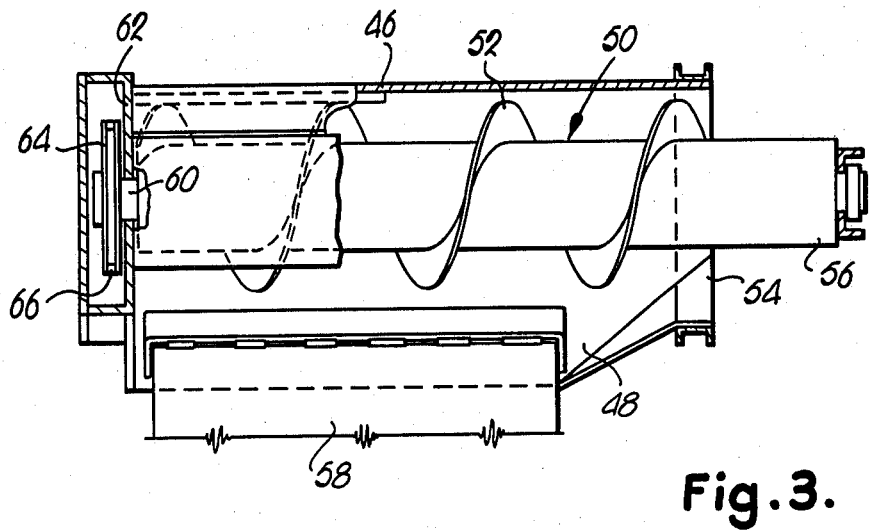
FIG. 3 is a fragmentary, top plan view of the double windrowing attachment with upper portions thereof removed to reveal details of construction.

The double windrowing mechanism 26 includes a special trough 46 that is open along its front side to present an elongated mouth or port 48. The trough 46 is carried by the arms 34 adjacent the lower ends thereof and is disposed with its longitudinal axis transverse to the normal path of travel of the machine. An auger 50 having a series of flights 52 is rotatably supported within the trough 46 for conveying crops laterally to an outboard position of the machine. The trough 46 has a discharge end 54 through which projects an extended portion 56 of the auger 50 in order to encourage crops conveyed by the latter to feed outwardly beyond the discharge end 54 and into the previous cut area in the field as will subsequently be discussed. Forming shields 58 of the machine receive cut crop from the mechanism 22 and the conditioner 24 and converge the same centrally into a stream which flows rearwardly of the machine and into the double windrowing mechanism 26 when the latter is lowered inasmuch as the forming shields 58 are operably aligned with the trough 46 as illustrated in FIG. 3.

Figure 4:
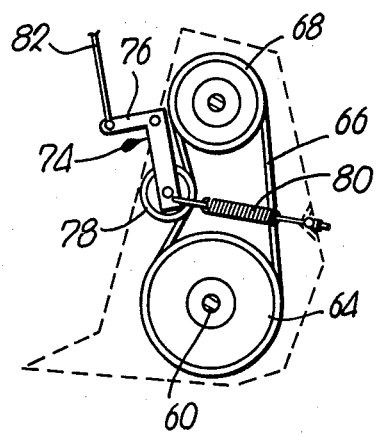
FIG. 4 is an enlarged, detail side view of drive apparatus associated with the attachment.

The opposite end of the auger 50 has a stub shaft 60 that projects through and beyond an endwall 62 of the trough 46. A sheave 64 is affixed to the stub shaft 60 and is entrained by an endless drive belt 66 that in turn entrains an upper drive sheave 68 receiving driving power from a gearbox 70 that in turn is ultimately coupled with the driveline 20 by an intermediate driveline 72. A belt tensioning assembly 74 for the belt 66 includes a bell crank 76 pivoted to the trough 46, an idler sheave 78 carried by one arm of the bell crank 76, and a tension spring 80 connected between the trough 46 and the depending arm of the bell crank 76 in order to normally bias the idler sheave 78 into belt tightening engagement with the forward stretch or run of the belt 66. However, a cable or length 82 connected to the opposite leg of the crank 76 is in turn connected to the U-shaped part 30 of the arm assembly 28 so that as the arms 34 are raised, the bell crank 76 is rocked in a clockwise direction viewing FIG. 4 to disengage the idler sheave 78 from the belt 66 sufficiently that the latter will slip on the drive sheave 68 and thereby disengage driving power to the conveying auger 50.

The two cylinders 40 and 42 are connected in a special hydraulic circuit arrangement. To this end, the cylinder 42 is coupled via a pair of lines 84 and 86 to the hydraulic system of the towing tractor such that the ram 88 of the cylinder 42 is extended and retracted. A line 90 which leads from the anchor end of the cylinder 42 is coupled in parallel fluid flow relationship with the line 84 such that when hydraulic fluid is supplied through the line 84 to the anchor end of cylinder 42, it is likewise supplied to the line 90 and thence to a check valve 92 permitting flow only in the direction of the arrow 94, i.e., toward the cylinder 40. Another line 96 leading from the check valve 94 communicates the cylinder 40 with the line 90. A bypass conduit 98 is connected in parallel fluid flow relationship to the check valve 94 and has an electrically operable control valve 100 associated therewith for opening and closing the bypass line 98 in response to opening and closing of the switch 102. Thus, when the valve 100 is closed by virtue of the fact that the switch 102 is opened (as is normally the case), fluid can flow to the cylinder 40 but not away from the same because of the one-way nature of the check valve 92. On the other hand, when the valve 100 is opened by closing the switch 102, a bypass path in the form of the line 98 is opened up such that fluid may flow away from the cylinder 40 in bypassing relationship to the check valve 92 via the line 98 and the line 90. The two cylinders 40 and 42 are so sized and their loads are so coordinated with such sizing that substantially less pressure is required to operate the cylinder 40 and thus raise the double windrowing mechanism 26 that is necessary to lift the cutting mechanism 22.

OPERATION

Figure 6:
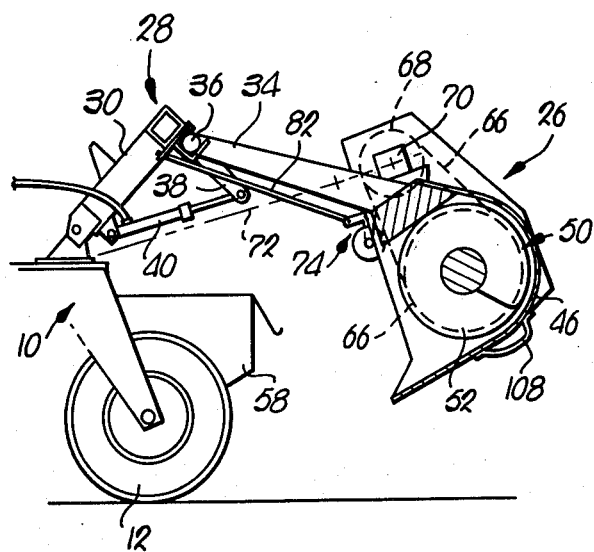
FIG. 6 is a view similar to FIG. 5 but with the attachment raised into a transport position.

When the double windrowing mechanism 26 is raised as in FIG. 6, the crop stream merely issues centrally from the machine into a centrally disposed windrow, such windrow being designated by the numeral 104 in FIG. 1 and hereinafter termed the "first windrow". Likewise, the cutting pass taken by the machine when the double windrowing mechanism 26 is raised has been designated by the numeral 106 in FIG. 1 and shall hereinafter be referred to as the "first cutting pass".

Figure 5:
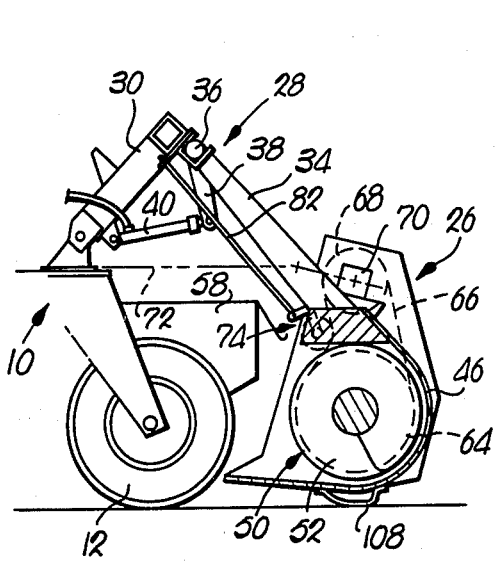
FIG. 5 is a schematic, side elevational view of the machine and double windrowing attachment showing the latter in its lowered, crop intercepting location for double windrowing.

On the next succeeding pass around the field in the same direction as the first pass 106, the double windrowing mechanism 26 is lowered to the position shown in FIG. 5 in which the skids 108 ride along the ground such that the mouth 48 of the trough 46 is disposed in intercepting relationship to the materials emanating from the rear of the machine out of the forming shields 58. The auger 50 feeds such materials to an outboard position of the second cutting pass 110 and dumps such material into the first cutting pass 106 adjacently alongside of the first windrow 104 such as to form a second windrow 112 as illustrated in FIG. 1. Then, on the next pass around the field, the double windrowing mechanism 26 is maintained in its raised position so that the crop materials issue directly from the machine centrally thereof to form another "first windrow".

Inasmuch as the cylinder 40 of double windrowing mechanism 26 is more responsive than or is operated at a lower pressure than the cylinder 42, the same circuit of the towing vehicle can be used for both cylinders 40 and 42 without adversely affecting operation of either because of the parallel flow relationship between the cylinders 40 and 42. Thus, in order to raise the double windrowing mechanism 26, oil is pumped along the line 84 to the cylinder 42 but also simultaneously to the cylinder 40 via the one-way check valve 94. When the appropriate pressure level is reached in the system, the double windrowing mechanism 26 will be raised as cylinder 42 remains unactuated at this time because its operating pressure level has not yet been reached. Once the double windrowing mechanism 26 has been fully raised, the control valve on the vehicle may simply be shifted into a neutral position so as to prevent return flow of oil to the vehicle, but in any event, the one-way check valve 94 will likewise prevent lowering of the double windrowing mechanism 26. If the operator thereafter closes the electrical switch 102 which has heretofore been opened, the valve 100 will correspondingly be opened to allow a drain path for fluid from the cylinder 40, thereby enabling the double windrowing mechanism 26 to be lowered to the ground when the operator throws the control valve on his vehicle to an appropriate position allowing the hydraulic circuitry of the machine to drain. If the operator wishes both the double windrowing mechanism 26 and the crop cutting mechanism 22 to be raised, he simply maintains the valve at his seat actuated such that oil continues to flow to the cylinder 42 after the double windrowing mechanism 26 has been raised, whereupon the operating level of the cylinder 42 is obtained and the mechanism 22 lifts. A pair of lugs 114 and 116 on the U-shaped part 30 and the arms 34 respectively of the arm assembly 28 can be pinned together when the double windrowing mechanism 26 is fully raised so as to provide a mechanical holding device for over-the-road transport of the double windrowing mechanism 26 in a raised position.

We claim:

1. A machine for harvesting crops comprising:

a mobile frame;

crop severing means carried by said frame at the normally forward extremity of the latter;

means for coupling said frame to a vehicle in such manner that the crop severing means is located in laterally offset relationship to the path of travel of the vehicle;

means for converging the severed crop centrally of the cut taken by the severing means and for discharging the converged crop rearwardly into a centrally disposed windrow behind the frame; and selectively operable double windrow forming mechanism carried by the frame, said mechanism including a transverse conveyor and means for selectively positioning said conveyor in a location behind the severing means to intercept the centrally converged and rearwardly discharged crop before the latter forms a windrow on the ground, said conveyor having a discharge end disposed for discharging crop laterally outboard of the cut taken by said severing means and into the path of travel of said vehicle behind the latter when said conveyor is in its said crop intercepting location whereby to permit formation of a second windrow adjacently alongside of a first windrow prepared during the next preceding pass of the machine with said conveyor positioned out of its said crop intercepting location, said severing means being mounted on said frame for movement between a raised, transport position and a lowered, working position, said severing means being provided with a fluid pressure operated power unit for effecting said raising and lowering of the severing means, said power device for the conveyor being fluid pressure operated and being coupled in parallel fluid flow relationship with said power unit of the severing means, said power device further being responsive to a lower pressure force than said power unit whereby to permit raising of the conveyor out of said crop intercepting location thereof without raising said severing means when the power unit and the power device are both pressurized.

2. A machine for harvesting crops as claimed in claim 1, wherein said coupling means includes an elongated towing tongue having a hitch at the normally forward end thereof.

3. A machine for harvesting crops as claimed in claim 1, wherein said conveyor includes a trough and a feed auger rotatable within said trough.

4. A machine for harvesting crops as claimed in claim 1, wherein said conveyor is mounted on said frame for vertical swinging movement toward and away from a lowered position corresponding to said crop intercepting location, said selective positioning means including a selectively operable power device connected between the frame and the conveyor for effecting said swinging movement of the latter.

5. A machine for harvesting crops as claimed in claim 1, wherein said power device is provided with a one-way check valve permitting fluid flow only in a direction toward said power device, said check valve being provided with a fluid bypass conduit in parallel fluid flow relationship therewith, said bypass conduit having a selectively operable control valve therein to allow fluid to bypass said check valve and thereby drain from said power device for lowering of the conveyor into said crop intercepting location thereof.

* * * * *